(12) United States Patent
Piech et al.

(10) Patent No.: US 10,199,889 B2
(45) Date of Patent: Feb. 5, 2019

(54) ELECTRIC MACHINE HAVING ROTOR WITH SLANTED PERMANENT MAGNETS

(71) Applicant: Otis Elevator Company, Farmington, CT (US)

(72) Inventors: Zbigniew Piech, Cheshire, CT (US); Jagadeesh Tangudu, Manchester, CT (US); Richard A. Himmelmann, Beloit, WI (US)

(73) Assignee: Otis Elevator Company, Farmington, CT (US)

( * ) Notice: Subject to any disclaimer, the term of this patent is extended or adjusted under 35 U.S.C. 154(b) by 479 days.

(21) Appl. No.: 14/899,005

(22) PCT Filed: Jun. 20, 2013

(86) PCT No.: PCT/US2013/046847
§ 371 (c)(1),
(2) Date: Dec. 16, 2015

(87) PCT Pub. No.: WO2014/204469
PCT Pub. Date: Dec. 24, 2014

(65) Prior Publication Data
US 2016/0126790 A1 May 5, 2016

(51) Int. Cl.
*H02K 1/27* (2006.01)
*H02K 16/04* (2006.01)
*H02K 1/30* (2006.01)

(52) U.S. Cl.
CPC ............. *H02K 1/27* (2013.01); *H02K 1/2706* (2013.01); *H02K 1/2766* (2013.01);
(Continued)

(58) Field of Classification Search
CPC ...... H02K 1/27; H02K 1/2706; H02K 1/2766; H02K 1/2786; H02K 1/30; H02K 1/28;
(Continued)

(56) References Cited

U.S. PATENT DOCUMENTS 4,859,974 A    8/1989   Kliman et al.
4,912,746 A    3/1990   Oishi
(Continued)

FOREIGN PATENT DOCUMENTS

CN    102306963 A    1/2012
JP    2003319584 A    11/2003
(Continued)

OTHER PUBLICATIONS

EP search report for EP13887070.4 dated Jan. 31, 2017.
Chinese office action for CN201380077486.2 dated Sep. 15, 2017.

*Primary Examiner* — Michael Andrews
(74) *Attorney, Agent, or Firm* — O'Shea Getz P.C.

(57) ABSTRACT

An electric machine including a rotor and an annularly-shaped first stator is provided. The rotor includes an annularly-shaped rotor body and permanent magnets positionally-fixed relative to the rotor body. The first stator includes circumferentially-spaced stator poles. The rotor and the first stator are concentric and axially-aligned relative to an axial centerline of the electric machine. Each of the permanent magnets creates a magnetic dipole. Each magnetic dipole extends along a dipole axis that passes through the respective permanent magnet. Each dipole axis extends in a first plane. The centerline of the electric machine extends in a second plane that is at least substantially perpendicular to the first plane. Each of the permanent magnets is positioned so that a magnet angle that is between 15° and 75° is defined between the respective dipole axis and a radial axis that extends between the respective permanent magnet and the centerline.

14 Claims, 9 Drawing Sheets

(52) U.S. Cl.
CPC ............. *H02K 1/2786* (2013.01); *H02K 1/30* (2013.01); *H02K 16/04* (2013.01)

(58) Field of Classification Search
CPC . H02K 16/04; H02K 2201/06; H02K 2201/00
USPC ............... 310/156.12, 156.53, 112, 216.008, 310/216.009
See application file for complete search history.

(56) References Cited

U.S. PATENT DOCUMENTS

| | | | |
|---|---|---|---|
| 4,933,584 A | 6/1990 | Harms et al. | |
| 5,701,039 A | 12/1997 | Parison et al. | |
| 6,340,857 B2 | 1/2002 | Nishiyama et al. | |
| 6,417,584 B1 | 7/2002 | Chitayat | |
| 6,459,185 B1* | 10/2002 | Ehrhart | H02K 1/27 310/156.35 |
| 6,791,214 B2 | 9/2004 | Korenaga | |
| 6,833,638 B2 | 12/2004 | Kang et al. | |
| 6,930,413 B2 | 8/2005 | Marzano | |
| 7,166,938 B2 | 1/2007 | Kang et al. | |
| 7,362,013 B2 | 4/2008 | Uchida | |
| 7,436,095 B2 | 10/2008 | Aydin et al. | |
| 7,474,019 B2 | 1/2009 | Kang et al. | |
| 7,474,029 B2 | 1/2009 | Rahman et al. | |
| 7,504,754 B2 | 3/2009 | Jahns et al. | |
| 7,851,958 B2 | 12/2010 | Cai et al. | |
| 8,227,953 B2 | 7/2012 | Suzuki et al. | |
| 2008/0197736 A1 | 8/2008 | Himmelmann et al. | |
| 2010/0007225 A1 | 1/2010 | Platon et al. | |
| 2010/0019612 A1 | 1/2010 | Lefley | |
| 2010/0052454 A1 | 3/2010 | Lin | |
| 2010/0301697 A1* | 12/2010 | Takahashi | H02K 1/2766 310/156.53 |
| 2011/0169364 A1* | 7/2011 | Maemura | H02K 1/2766 310/156.01 |
| 2012/0007465 A1 | 1/2012 | Fargo et al. | |
| 2012/0091845 A1* | 4/2012 | Takemoto | H02K 1/276 310/156.01 |
| 2012/0126658 A1 | 5/2012 | Sanji et al. | |
| 2013/0020897 A1 | 1/2013 | Takizawa | |
| 2013/0088112 A1 | 4/2013 | Cho et al. | |
| 2013/0099618 A1 | 4/2013 | Kusase | |
| 2013/0113326 A1 | 5/2013 | Morishita et al. | |

FOREIGN PATENT DOCUMENTS

| | | |
|---|---|---|
| JP | 2010252419 A | 11/2010 |
| LV | 14509 A | 4/2012 |

* cited by examiner

ELECTRIC MACHINE HAVING ROTOR WITH SLANTED PERMANENT MAGNETS

This application claims priority to PCT Patent Application No. PCT/US13/046847 filed Jun. 20, 2013, which is hereby incorporated by reference.

BACKGROUND

1. Technical Field

Aspects of the present invention generally relate to electric machines, and more specifically relate to electric machines having a rotor with slanted permanent magnets.

2. Background Information

It is known to provide an electric machine having a rotor with a plurality of permanent magnets. The permanent magnets are typically positioned on the rotor in one of several known configurations. These known configurations may cause the rotor to have a diameter that is greater than desired. Aspects of the present invention are directed to this and other problems.

SUMMARY OF ASPECTS OF THE INVENTION

According to an aspect of the present invention, an electric machine including a rotor and an annularly-shaped first stator is provided. The rotor includes an annularly-shaped rotor body and a plurality of permanent magnets positionally-fixed relative to the rotor body. The first stator includes a plurality of circumferentially-spaced stator poles. The rotor and the first stator are concentric and axially-aligned relative to an axial centerline of the electric machine. Each of the plurality of permanent magnets creates a magnetic dipole. Each magnetic dipole extends along a dipole axis that passes through the respective permanent magnet. Each dipole axis extends in a first plane. The centerline of the electric machine extends in a second plane that is at least substantially perpendicular to the first plane. Each of the plurality of permanent magnets is positioned so that a magnet angle that is between 15° and 75° is defined between the respective dipole axis and a radial axis that extends between the respective permanent magnet and the centerline of the electric machine.

According to another aspect of the present invention, a rotor for use in an electric machine is provided. The rotor includes an annularly-shaped rotor body and a plurality of permanent magnets positionally-fixed relative to the rotor body. The rotor body is concentric relative to an axially-extending centerline of the electric machine. The rotor body includes a plurality of axially-positioned rotor rings, each including a plurality of arcuate rotor body pieces that are positioned end-to-end to form the respective rotor rings. Each of the plurality of permanent magnets creates a magnetic dipole. Each magnetic dipole extends along a dipole axis that passes through the respective permanent magnet. Each dipole axis extends in a first plane. The centerline of the electric machine extends in a second plane that is at least substantially perpendicular to the first plane. Each of the plurality of permanent magnets is positioned so that a magnet angle that is between 15° and 75° is defined between the respective dipole axis and a radial axis that extends between the respective permanent magnet and the centerline of the electric machine.

According to another aspect of the present invention, a rotor for use in an electric machine is provided. The rotor includes an annularly-shaped rotor body and a plurality of permanent magnets positionally-fixed relative to the rotor body. The rotor body is concentric relative to an axially-extending centerline of the electric machine. The rotor body includes a plurality of arcuate rotor body pieces that are positioned end-to-end to form the rotor body. Each of the arcuate rotor body pieces includes a plurality of axially-positioned panels that are axially-compressed to form the respective rotor body piece. Each of the plurality of permanent magnets creates a magnetic dipole. Each magnetic dipole extends along a dipole axis that passes through the respective permanent magnet. Each dipole axis extends in a first plane. The centerline of the electric machine extends in a second plane that is at least substantially perpendicular to the first plane. Each of the plurality of permanent magnets is positioned so that a magnet angle that is between 15° and 75° is defined between the respective dipole axis and a radial axis that extends between the respective permanent magnet and the centerline of the electric machine.

These and other aspects of the present invention will become apparent in light of the drawings and detailed description provided below.

DETAILED DESCRIPTION

Figure 1:
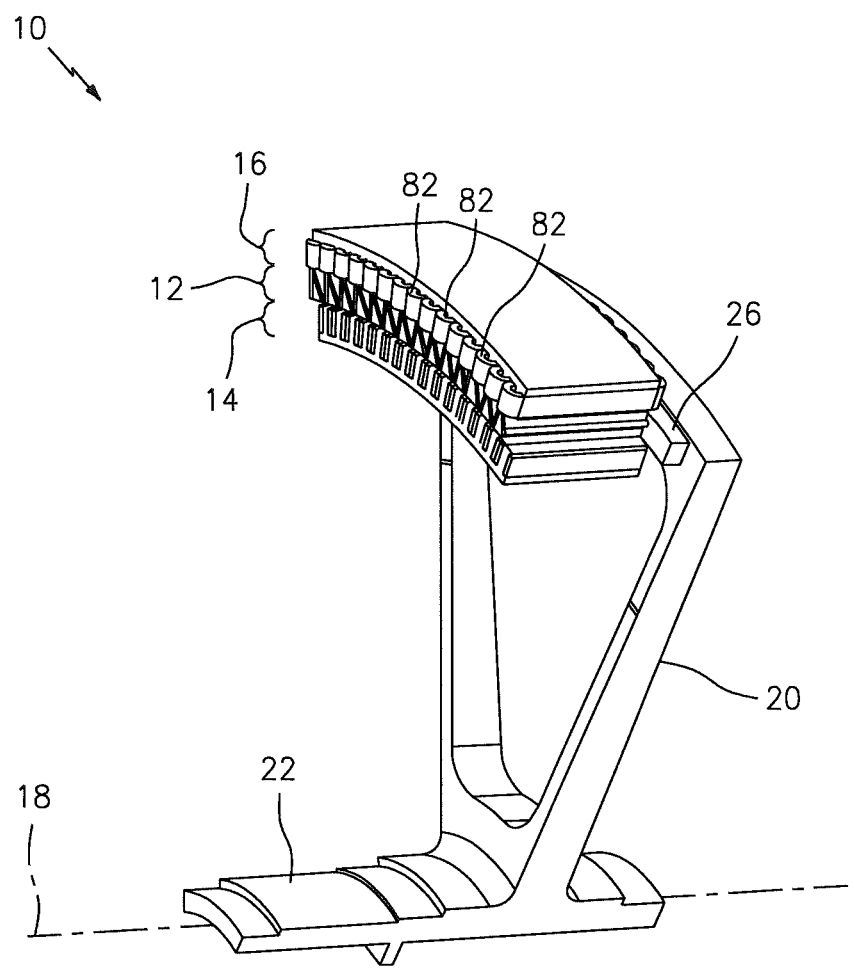
FIG. 1 illustrates a partial perspective view of an electric machine embodiment.
Figure 2:
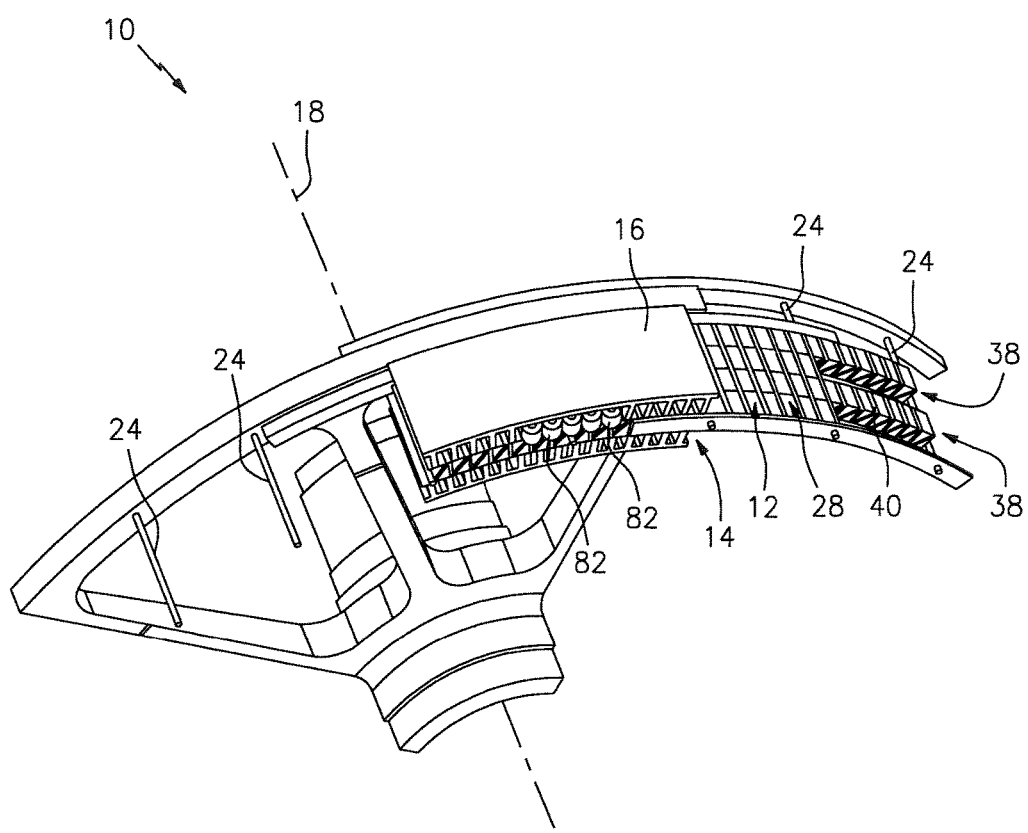
FIG. 2 illustrates a partial perspective view of the electric machine of FIG. 1.
Figure 5:
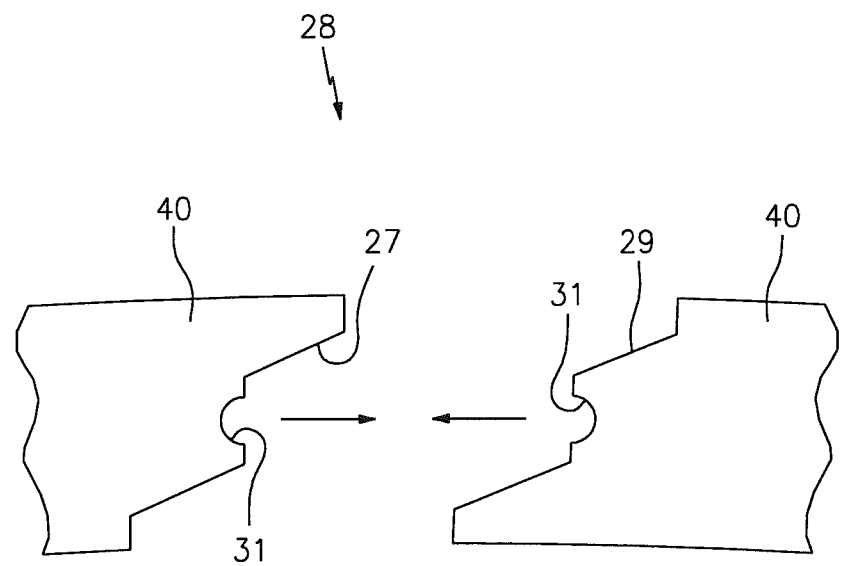
FIG. 5 illustrates a partial sectional view of two (2) rotor body pieces of the rotor of FIG. 1.
Figure 6:
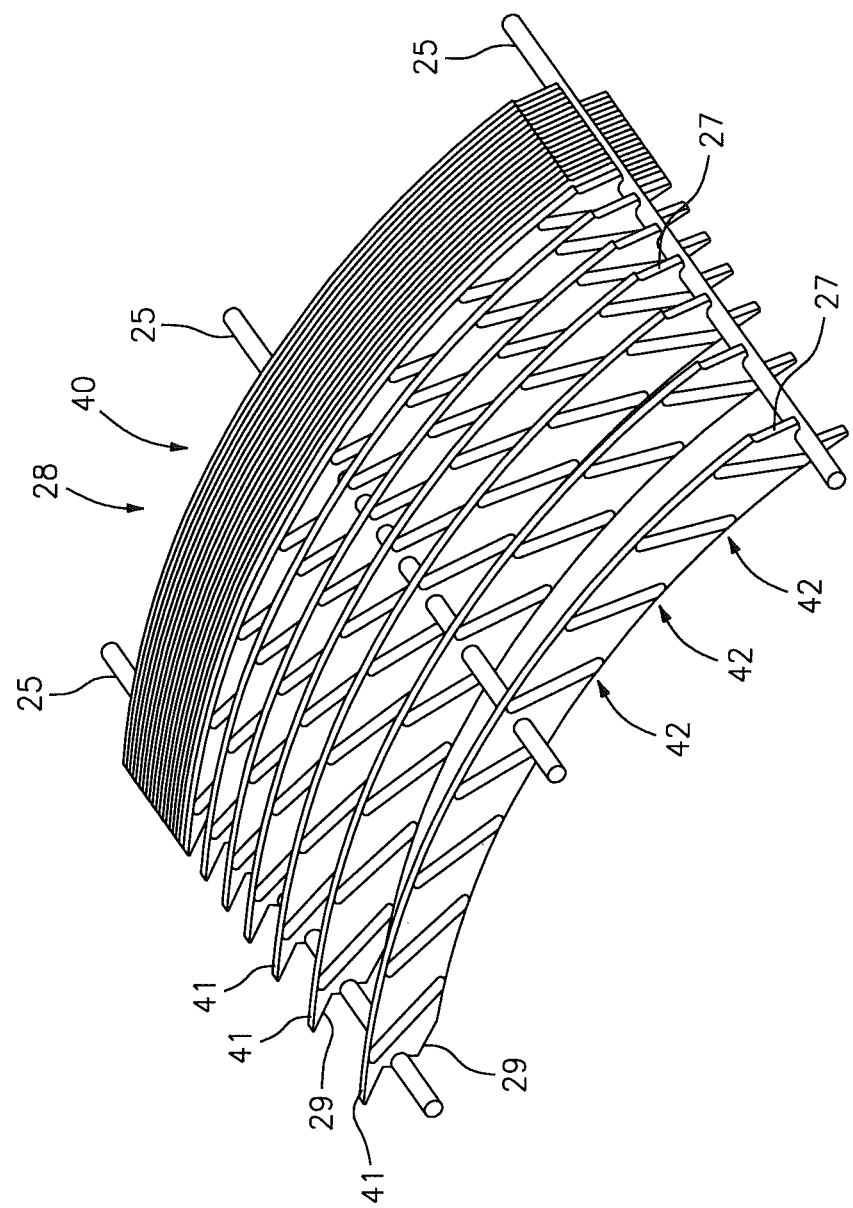
FIG. 6 illustrates an exploded view of a rotor body piece included in the rotor of the electric machine of FIG. 1.

Referring to FIGS. 1 and 2, the present disclosure describes embodiments of an electric machine 10 that includes a rotor 12 and one or more stators 14, 16. The electric machine 10 may be operated as an electric motor, or as an electric generator. The rotor 12 and the stators 14, 16 are concentric and axially-aligned relative to an axial centerline 18 of the electric machine 10. The rotor 12 is attached to a rotor support 20, and the rotor support 20 is attached to a shaft 22 that extends along the centerline 18 of the electric machine 10. The rotor 12 rotates relative to the stators 14, 16, which are positionally-fixed to a housing (not shown) of the electric machine 10. Aspects of the present invention are described herein with reference to the embodiments illustrated in the drawings; however, aspects of the present invention are not limited to the embodiments illustrated in the drawings. In the embodiment illustrated in FIGS. 1-7, the rotor 12 is positioned concentrically between an inner stator 14 and an outer stator 16 (see FIGS. 1-3); the rotor 12 is positioned axially between an annularly-shaped, electrically non-conductive end ring 24 (see FIG. 2) and an annularly-shaped, electrically non-conductive separator 26 (see FIGS. 1 and 2); the separator 26 is positioned axially between the rotor 12 and the rotor support 20; and the rotor 12, the end ring 24, and the separator 26 are attached to the rotor support 20 using pins 25 (see FIGS. 2, 6, and 7), as will be described further below.

The rotor 12 includes an annularly-shaped rotor body 28 (see FIGS. 2-7) and a plurality of permanent magnets 30, 32, 34, 36 (see FIGS. 3 and 4) that are positionally-fixed relative to the rotor body 28. In the embodiment illustrated in FIGS. 1-7, the rotor body 28 includes a plurality of circumferentially-spaced, axially-extending slots 42 (see FIGS. 3, 6, and 7) within which the permanent magnets 30, 32, 34, 36 are disposed so as to positionally fix them relative to the rotor body 28. The permanent magnets 30, 32, 34, 36 each generate an individual magnetic field, and collectively generate a rotor magnetic field. At least a portion of the rotor magnetic field extends from the rotor 12 in a radial direction to interact with the stators 14, 16. The rotor magnetic field rotates relative to the stators 14, 16 during operation of the electric machine 10. The rotor body 28 and the permanent magnets 30, 32, 34, 36 are described in detail below.

The performance of the electric machine 10 may depend, at least in part, on one or more features of the rotor magnetic field; e.g., the strength of the rotor magnetic field, the symmetry of the rotor magnetic field, etc. Accordingly, the electric machine 10 may be designed so that the rotor 12 achieves a desired rotor magnetic field. The present disclosure describes several features of the rotor body 28 that may be selected to achieve a desired rotor magnetic field. The rotor body 28 can influence the rotor magnetic field because it can alter the individual magnetic fields generated by the permanent magnets 30, 32, 34, 36 as they (the individual magnetic fields) pass through the rotor body 28; e.g., the rotor body 28 may induce eddy currents as the individual magnetic fields pass through the rotor body 28, thereby causing the individual magnetic fields to lose strength, and/or the rotor body 28 may alter the direction of the individual magnetic fields as they pass through the rotor body 28. The present disclosure also describes how characteristics of the permanent magnets 30, 32, 34, 36 and/or the positioning of the permanent magnets 30, 32, 34, 36 on the rotor 12 may be selected to achieve a desired rotor magnetic field.

The performance of the electric machine 10 may also depend, at least in part, on the structural integrity of the electric machine 10; e.g., the ability of the rotor 12 to rotate relative to the stators 14, 16 without causing the electric machine 10 to vibrate. Accordingly, the electric machine 10 may be designed with structural integrity in mind. The present disclosure describes features that may aid in improving structural integrity of the rotor body 28 in embodiments in which the rotor body 28 is segmented into a plurality of pieces. As will be described below, the rotor body 28 may be segmented into a plurality of pieces, for example, so that the rotor 12 achieves a desired rotor magnetic field.

The performance of the electric machine 10 may also depend, at least in part, on the interaction of the rotor magnetic field with the stators 14, 16; e.g., the flux of the rotor magnetic field through the stators 14, 16. Accordingly, the electric machine 10 may be designed to achieve a desired interaction of the rotor magnetic field with the stators 14, 16. The present disclosure describes how the structure of the stators 14, 16 and/or the positioning of the stators 14, 16 may be selected to achieve a desired interaction of the rotor magnetic field with the stators 14, 16.

The rotor body 28 may be a unitary structure, or it may be segmented; e.g., circumferentially segmented, axially segmented, etc. In the embodiment in FIGS. 1-7, the rotor body 28 is both circumferentially segmented and axially segmented; the rotor body 28 includes four (4) axially-positioned rotor rings 33, 35, 37, 39 (see FIGS. 2 and 7), each including a plurality of arcuate rotor body pieces 40 (see FIGS. 2-7) that are positioned end-to-end to form the respective rotor rings 33, 35, 37, 39. In some embodiments, including the embodiment illustrated in FIG. 5, the rotor body pieces 40 may be shaped so that adjacent rotor body pieces 40 mate and circumferentially overlap one another when they are positioned end-to-end to form the respective rotor rings 33, 35, 37, 39 of the rotor body 28. FIG. 5 illustrates how two (2) adjacent body pieces 40 can be brought together to mate and circumferentially overlap one another. The circumferential overlap of adjacent rotor body pieces 40 may aid in improving the structural integrity of the electric machine 10; e.g., stiffness of the rotor body 28 may be improved, which in turn may reduce or eliminate vibrations that might otherwise occur during operation of the electric machine 10. In some embodiments, the rotor body pieces 40 may be shaped so that adjacent rotor body pieces 40 collectively form an axially-extending aperture through which a pin 25 may be inserted. In the embodiment illustrated in FIGS. 5-7, for example, each rotor body piece 40 extends circumferentially between a first end surface 27 and a second end surface 29, and the end surfaces 27, 29 of the rotor body pieces 40 each include a notch 31. FIG. 5 illustrates that the notch 31 included in the first end surface 27 of a rotor body piece 40 and the notch 31 included in the second end surface 29 of an adjacent rotor body piece 40 collectively form an aperture when the adjacent body pieces 40 are brought together to mate and circumferentially overlap one another. It may be desirable to provide a rotor body 28 that is segmented as shown, for example, in FIGS. 2, 6, and 7, for one or more reasons. For example, in some embodiments the rotor 12 can have a relatively large diameter, and thus it may be easier and/or less expensive to manufacture the rotor body 28 if it is segmented. Also, segmenting the rotor body 28 may make it easier to replace or repair a portion of the rotor body 28. Also, segmenting the rotor body 28 may enable the rotor 12 to achieve a desired rotor magnetic field. A rotor body 28 that is a unitary structure may weaken the individual magnetic fields generated by the permanent magnets 30, 32, 34, 36 as they pass through the rotor body 28 to a greater extent than a rotor body 28 that is segmented, and thus the rotor body 28 may be segmented, for example, to achieve a relatively stronger rotor magnetic field.

In embodiments in which the rotor body 28 includes a plurality of rotor body pieces 40, each rotor body piece 40 may be a unitary structure, or each may be axially segmented. In the embodiment in FIGS. 1-7, each rotor body piece 40 is axially segmented into a plurality of panels 41 (see FIGS. 6 and 7). In embodiments in which the rotor body pieces 40 are axially segmented into a plurality of panels 41, the rotor body pieces 40 are not limited to any particular number of panels 41, and the panels 41 are not limited to any particular axial thickness. In some embodiments in which the rotor body pieces 40 are axially segmented into a plurality of panels 41, axially adjacent panels 41 may be attached to one another; e.g., using adhesives, mechanical fasteners, mating features (e.g., dimples) provided on the panels 41, etc. In some embodiments in which the rotor body pieces 40 are axially segmented into a plurality of panels 41, a structure may be provided to axially compress the panels 41 together to form the rotor body pieces 40. In the embodiment illustrated in FIGS. 1-7, for example, the pins 25 (see FIGS. 2, 6, and 7) extend through apertures that are formed in (or formed by) the rotor body pieces 40, and the pins 25 provide axial tension between the end ring 24 (see FIG. 2) and the separator 26 (see FIGS. 1 and 2), which in turn axially compresses the panels 41 together to form the rotor body pieces 40. Such structures for axially compressing the panels 41 may aid in improving the structural integrity of the electric machine 10; e.g., stiffness of the rotor body 28 may be improved, which in turn may reduce or eliminate vibrations that might otherwise occur during operation of the electric machine 10. It may be desirable to provide rotor body pieces 40 that are axially segmented as shown, for example, in FIGS. 6 and 7, for one or more reasons. For example, axially segmenting the rotor body pieces 40 may make it easier to replace or repair a portion of a rotor body piece 40. Also, axially segmenting the rotor body pieces 40 may make it easier and/or less expensive to manufacture the rotor body pieces 40. Referring to FIG. 8, for example, it may be possible to cut (or punch, or press, etc.) the plurality of panels 41 used to form the rotor body pieces 40 from a workpiece 43, which may be a relatively thin sheet of material. The panels 41 may be cut from the workpiece 43 so that the amount of scrap material created is less than that which would be created in manufacturing a rotor body piece 40 that is a unitary structure. Also, axially segmenting the rotor body pieces 40 may enable the rotor 12 to achieve a desired rotor magnetic field. A rotor body piece 40 that is a unitary structure may weaken the individual magnetic fields generated by the permanent magnets 30, 32, 34, 36 as they pass through the rotor body piece 40 to a greater extent than a rotor body piece 40 that is segmented, and thus the rotor body piece 40 may be segmented, for example, to achieve a relatively stronger rotor magnetic field.

Figure 7:
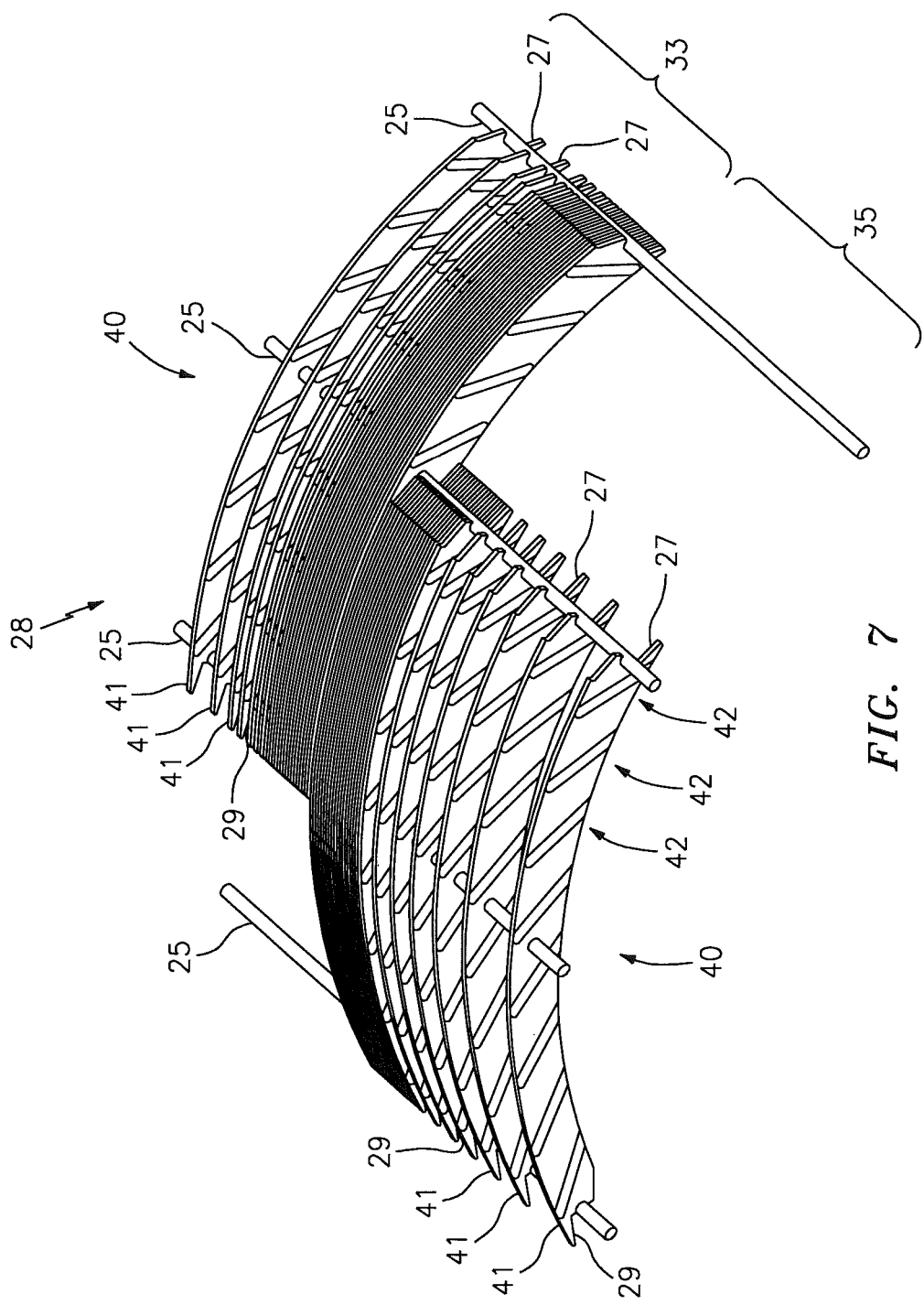
FIG. 7 illustrates an exploded view of two (2) rotor body pieces included in the rotor of the electric machine of FIG. 1.
Figure 8:
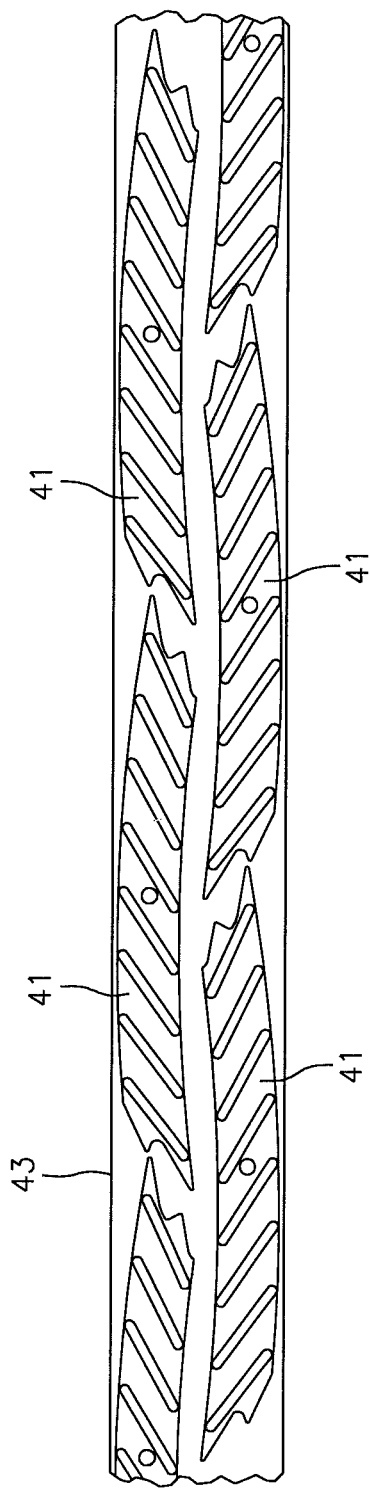
FIG. 8 illustrates panels, which are used to form the rotor body pieces of the rotor, being cut from a workpiece.

In embodiments similar to the one illustrated in FIGS. 1-7, in which the rotor body 28 includes a plurality of rotor body pieces 40 that are positioned end-to-end to form a plurality of axially-positioned rotor rings 33, 35, 37, 39 (see FIGS. 2 and 7), the rotor rings 33, 35, 37, 39 may be circumferentially offset from one another by a rotor ring offset angle. That is, for example, the rotor rings 33, 35, 37, 39 may be positioned relative to one another so that the end surfaces 27, 29 of the rotor body pieces 40 are not all circumferentially aligned from one rotor rings 33, 35, 37, 39 to the next. This feature is shown, for example, in FIG. 7. In FIG. 7, the first end surface 27 of the rotor body piece 40 included in the first rotor ring 33 is circumferentially offset, by a rotor ring offset angle, from the first end surface 27 of the rotor body piece 40 included in the second rotor ring 35. Aspects of the present invention are not limited to use with any particular rotor ring offset angle; however, the rotor rings 33, 35, 37, 39 may preferably be positioned relative to one another so that the permanent magnets 30, 32, 34, 36 are circumferentially aligned from one rotor ring 33, 35, 37, 39 to the next, and so that the apertures that are formed in (or formed by) the rotor body pieces 40 are circumferentially aligned from one rotor ring 33, 35, 37, 39 to the next. It may be desirable to provide a rotor body 28 that includes a plurality of rotor rings 33, 35, 37, 39 that are circumferentially offset from one another for one or more reasons. For example, circumferentially offsetting the rotor rings 33, 35, 37, 39 from one another may aid in improving the structural integrity of the electric machine 10; e.g., circumferentially offsetting the rotor rings 33, 35, 37, 39 may enable the rotor body 28 to have a more continuous load in the circumferential direction, which in turn may reduce or eliminate vibrations that might otherwise occur during operation of the electric machine 10. Also, circumferentially offsetting the rotor rings 33, 35, 37, 39 from one another may enable the rotor 12 to achieve a desired rotor magnetic field. Referring to FIG. 5, in some embodiments there may exist a relatively small gap between the first end surface 27 of a rotor body piece 40 and the second end surface 29 of an adjacent rotor body piece 40. The individual magnetic fields generated by the permanent magnets 30, 32, 34, 36 may pass through such gaps with relatively little weakening, especially if the gaps extend axially between a forward surface of the rotor body 28 and an aft end of the rotor body 28. Circumferentially offsetting the plurality of rotor rings 33, 35, 37, 39 from one another may prevent such gaps from extending axially between a forward surface of the rotor body 28 and an aft end of the rotor body 28, and may thereby enable the rotor 12 to achieve a relatively more symmetric rotor magnetic field.

In some embodiments, including the embodiment illustrated in FIGS. 1-7, the rotor body 28 may include a plurality of flux barriers 78. The flux barriers 78 are omitted from FIGS. 6 and 7, but can be seen, for example, in FIGS. 3 and 4. In the embodiment illustrated in FIGS. 1-7, each flux barrier 78 is an axially-extending aperture disposed in the rotor body 28 circumferentially between the slots 42 (see FIGS. 3, 6, and 7) within which the permanent magnets 30, 32, 34, 36 are disposed. It may be desirable to include flux barriers 78 in the rotor body 28 for one or more reasons. For example, the inclusion of flux barriers 78 may aid in reducing the overall weight of the rotor body 28. Also, the inclusion of flux barriers 78 in the rotor body 28 may enable the rotor 12 to achieve a desired rotor magnetic field. The inclusion of flux barriers 78 in the rotor body 28 may alter the direction of the individual magnetic fields as they pass through the rotor body 28, and may thereby enable the rotor 12 to achieve a relatively more symmetric rotor magnetic field.

The rotor body 28, or components thereof, can be made from various materials or combinations of materials. Examples of acceptable materials include: steel, nickel, iron, cobalt, and combinations thereof. In some embodiments, the rotor body 28, or components thereof, may be coated with a material (e.g., a laminate material), that may include, for example, silicon. The material(s) of the rotor body 28, or components thereof, may be selected so that the rotor 12 achieves a desired rotor magnetic field. For example, a rotor body 28 that includes certain material(s) may weaken the individual magnetic fields generated by the permanent magnets 30, 32, 34, 36 as they pass through the rotor body piece 40 to a greater extent than a rotor body piece 40 that is made of other material(s), and thus the material(s) of the rotor body piece 40 may be selected, for example, to achieve a relatively stronger rotor magnetic field.

The permanent magnets 30, 32, 34, 36 each have a remnant flux density. The term "remnant flux density" is used herein to describe the magnetic strength of the permanent magnets 30, 32, 34, 36. The permanent magnets 30, 32, 34, 36 are not limited to any particular remnant flux density. The remnant flux density may be the same for all of the permanent magnets 30, 32, 34, 36, or the remnant flux density may be different for one or more of the permanent magnets 30, 32, 34, 36. In embodiments in which the remnant flux density is the same for all of the permanent magnets 30, 32, 34, 36, an example of an acceptable remnant flux density for each of the permanent magnets 30, 32, 34, 36 is approximately one (1) Tesla. The remnant flux density of the permanent magnets 30, 32, 34, 36 may be selected to enable the rotor 12 to achieve a desired rotor magnetic field. For example, if a relatively strong rotor magnetic field is desired, permanent magnets 30, 32, 34, 36 having a relatively high remnant flux density may be selected.

Figure 4:
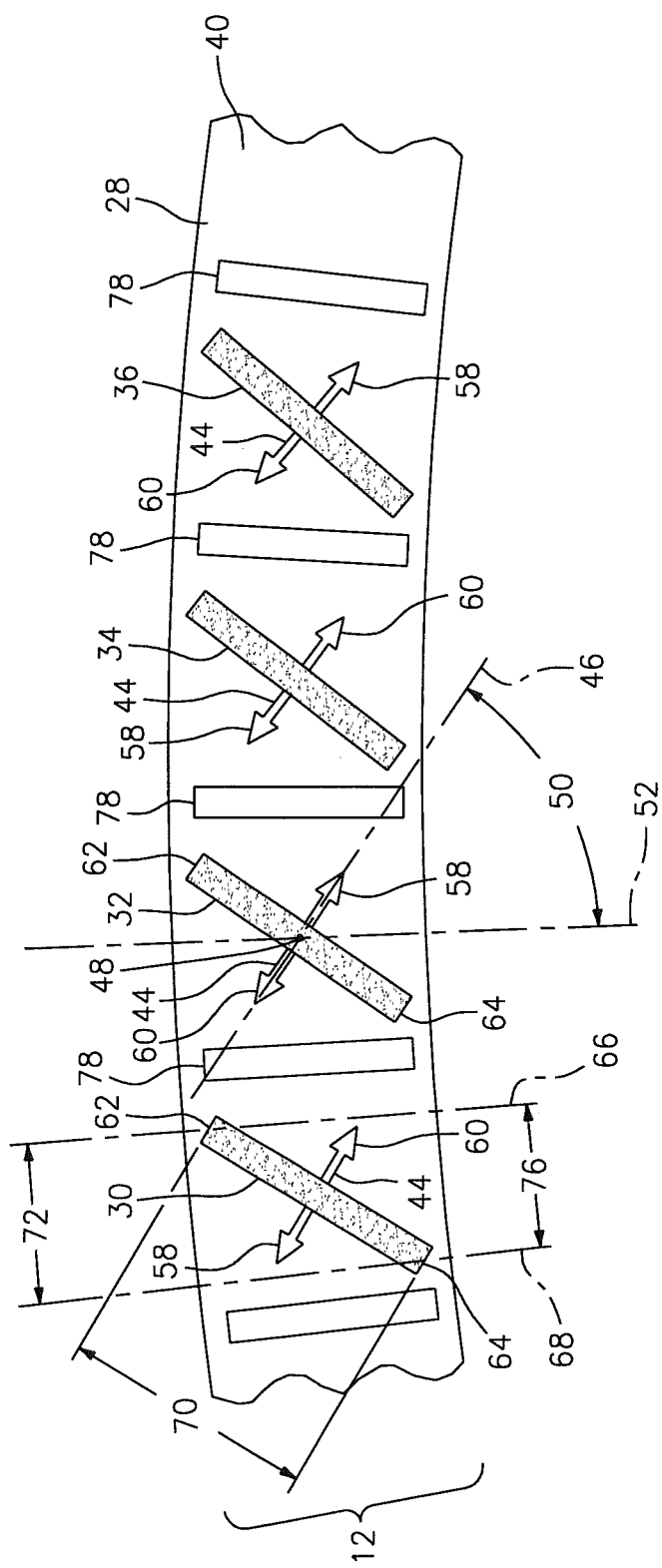
FIG. 4 illustrates a partial sectional view of the rotor of FIG. 1.

Referring to FIG. 4, the permanent magnets 30, 32, 34, 36 each create a magnetic dipole 44 that extends along a dipole axis 46 that passes through the respective permanent magnet 30, 32, 34, 36. Each magnet dipole 44 extends in a first plane, and the centerline 18 (see FIGS. 1 and 2) of the electric machine 10 extends in a second plane that is perpendicular or substantially perpendicular to the first plane. Each of the permanent magnets 30, 32, 34, 36 is positioned so that a magnet angle 50 that is between approximately fifteen degrees (15°) and seventy-five degrees (75°) is defined between the respective dipole axis 46 and a radial axis 52 that extends radially between the respective permanent magnet 30, 32, 34, 36 and the centerline 18 of the electric machine 10. The permanent magnets 30, 32, 34, 36 each may be described hereinafter as being slanted at the respective magnet angle 50. The magnet angles 50 of the permanent magnets 30, 32, 34, 36 may all be the same, or some or all may be different from one another. In the embodiment illustrated in FIG. 4, for example, the permanent magnets 30, 32, 34, 36 all have a magnet angle 50 that is approximately forty-five degrees (45°). In other embodiments, including the embodiment in FIG. 9, the permanent magnets 30, 32, 34, 36 may be grouped into a plurality of magnet groups 54, 56, and the magnet angles 50 of the permanent magnets 30, 32, 34, 36 within each magnet group 54, 56 may all be the same, or some or all may be different. In some embodiments, the number of permanent magnets 30, 32, 34, 36 within each magnet group 54, 56 may be the same, and the magnet angles 50 of the permanent magnets 30, 32, 34, 36 may be selected to have a repeatable pattern within each magnet group 54, 56. In the embodiment in FIG. 9, for example, each of the magnet groups 54, 56 includes a first permanent magnet 30 having a magnet angle 50, a second permanent magnet 32 having a magnet angle 50 plus two degrees (2°), a third permanent magnet 34 having a magnet angle 50 plus four degrees (4°), and a fourth permanent magnet 36 having a magnet angle 50 plus six degrees (6°). In embodiments similar to the one illustrated in FIG. 9, the different magnet angles 50 of neighboring permanent magnets 30, 32, 34, 36 may cause the rotor magnetic field to be asymmetric, and thus a characteristic (e.g., remnant flux density) may be selected to vary between neighboring permanent magnets 30, 32, 34, 36 to increase the symmetry of the rotor magnetic field. It may be desirable to provide permanent magnets 30, 32, 34, 36 that are slanted at a magnet angle 50 that is between approximately fifteen degrees (15°) and seventy-five degrees (75°) for one or more reasons. For example, slanting the permanent magnets 30, 32, 34, 36 as described herein may enable the rotor 12 to have a diameter that is smaller than that of a prior art rotor having permanent magnets positioned at magnet angles of either zero degrees (0°) or ninety degrees (90°).

Referring to FIG. 4, the permanent magnets 30, 32, 34, 36 are positioned so that the magnetic dipole 44 of each permanent magnet 30, 32, 34, 36 has a polarity that is opposite that of the magnetic dipoles 44 of the two (2) neighboring permanent magnets 30, 32, 34, 36. In the embodiment illustrated in FIG. 4, for example, the magnetic dipole 44 of the first permanent magnet 30 has a south pole 58 and a north pole 60 extending radially towards the centerline 18; the magnetic dipole 44 of the second permanent magnet 32 has a south pole 58 and a north pole 60 extending radially away from the centerline 18; the magnetic dipole 44 of the third permanent magnet 34 has a south pole 58 and a north pole 60 extending radially towards the centerline 18; and the magnetic dipole 44 of the fourth permanent magnet 36 has a south pole 58 and a north pole 60 extending radially away from the centerline 18. It may be desirable to provide permanent magnets 30, 32, 34, 36 that have alternating polarity, as shown for example, in FIG. 4, for one or more reasons. For example, the alternating polarity of the permanent magnets 30, 32, 34, 36 may enable the rotor 12 to achieve a symmetric rotor magnetic field.

Figure 9:
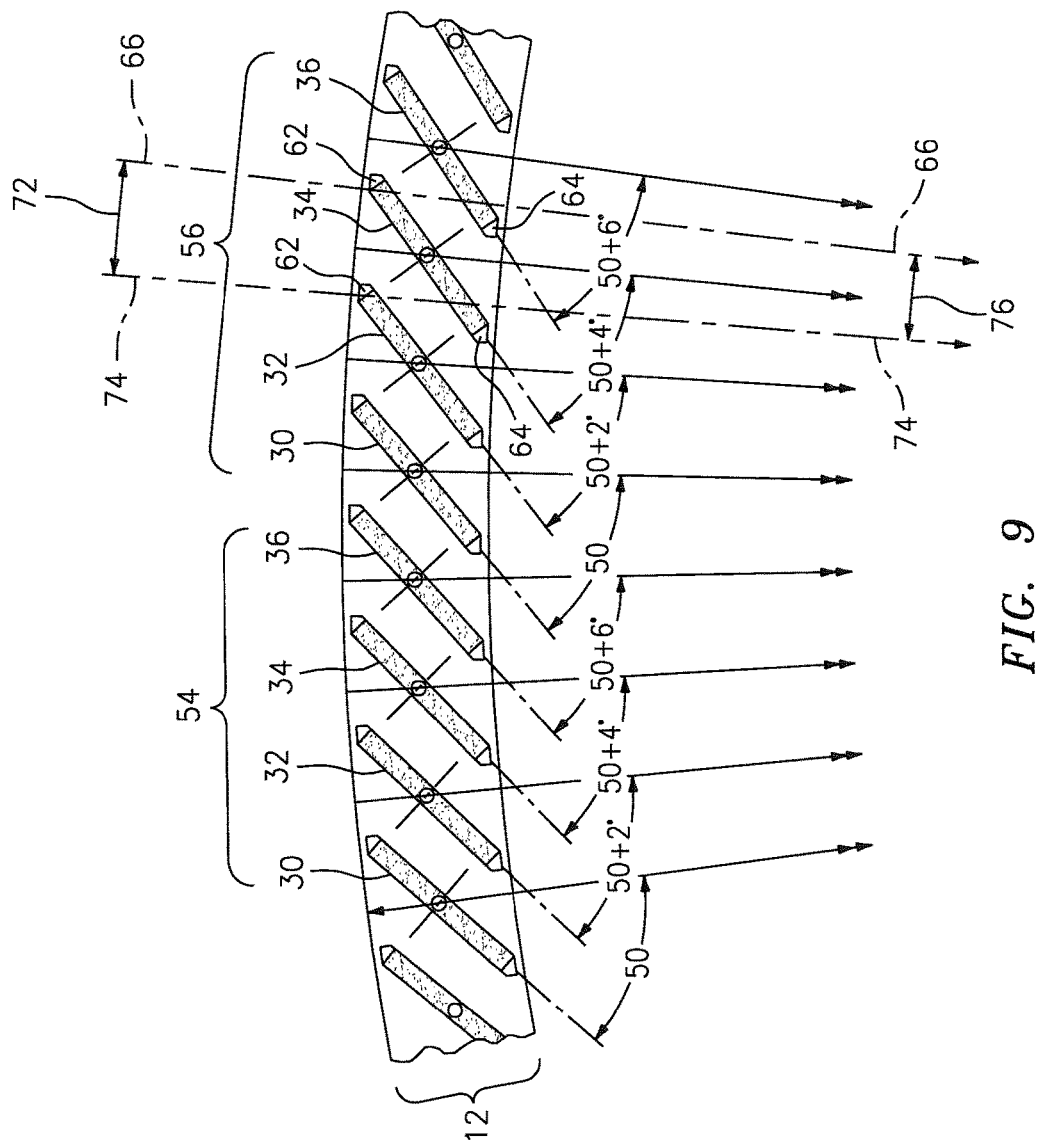
FIG. 9 illustrates a partial sectional view of an alternative rotor.

Referring to FIGS. 4 and 9, the permanent magnets 30, 32, 34, 36 may be positioned so that they are circumferentially overlapping or circumferentially non-overlapping. In embodiments in which the permanent magnets 30, 32, 34, 36 are circumferentially overlapping, including the embodiment illustrated in FIG. 9, a radially outer end 62 of each permanent magnet 30, 32, 34, 36 circumferentially overlaps a radially inner end 64 of an adjacent permanent magnet 30, 32, 34, 36; e.g., a radial axis 66 extending between the radially outer end 62 of each permanent magnet 30, 32, 34, 36 and the centerline 18 of the electric machine 10 will pass through an adjacent permanent magnet 30, 32, 34, 36. In embodiments in which the permanent magnets 30, 32, 34, 36 are circumferentially non-overlapping, including the embodiment illustrated in FIG. 4, a radially outer end 62 of each permanent magnet 30, 32, 34, 36 does not circumferentially overlap a radially inner end 64 of the adjacent permanent magnet 30, 32, 34, 36; e.g., the radial axis 66 extending between the radially outer end 62 of each permanent magnet 30, 32, 34, 36 and the centerline 18 of the electric machine 10 will not pass through the adjacent permanent magnet 30, 32, 34, 36. In embodiments in which the permanent magnets 30, 32, 34, 36 are circumferentially overlapping, each of the permanent magnets 30, 32, 34, 36 will only overlap the portion of the adjacent permanent magnet 30, 32, 34, 36 that extends between the radially outer end 62 of the adjacent permanent magnet 30, 32, 34, 36 and the center of the adjacent permanent magnet 30, 32, 34, 36, the center being a location on the adjacent permanent magnet 30, 32, 34, 36 that is approximately half way between its radially outer end 62 and its radially inner end 64. It may be desirable to provide permanent magnet 30, 32, 34, 36 that are circumferentially overlapping or circumferentially non-overlapping for one or more reasons. For example, circumferentially overlapping the permanent magnets 30, 32, 34, 36 may enable the rotor 12 to have a relatively small diameter. Also, circumferentially overlapping the permanent magnets 30, 32, 34, 36 enable the rotor 12 to achieve a symmetric rotor magnetic field.

Referring to FIGS. 4 and 9, each permanent magnet 30, 32, 34, 36 may be described as having an outer exposure fraction and an inner exposure fraction.

Referring to FIG. 4, the outer exposure fraction of each permanent magnet 30, 32, 34, 36 is equal to a ratio of two values: (1) a body width 70 of the respective permanent magnet 30, 32, 34, 36; and (2) an outer exposure width 72 of the respective permanent magnet 30, 32, 34, 36. The body width 70 of the each permanent magnet 30, 32, 34, 36 is a distance that extends between the radially inner end 64 and the radially outer end 62 of the respective permanent magnet 30, 32, 34, 36. In embodiments in which the permanent magnets 30, 32, 34, 36 are circumferentially non-overlapping, the outer exposure width 72 is a distance that extends circumferentially, at a position radially outward from the respective permanent magnets 30, 32, 34, 36, between two axes: (1) the radial axis 66 that extends between the radially outer end 62 of the respective permanent magnet 30, 32, 34, 36 and the centerline 18 of the electric machine 10; and (2) a radial axis 68 that extends between the radially inner end 64 of the respective permanent magnet 30, 32, 34, 36 and the centerline 18 of the electric machine 10. Referring to FIG. 9, in embodiments in which the permanent magnets 30, 32, 34, 36 are circumferentially overlapping, the outer exposure width 72 is a distance that extends circumferentially, at a position radially outward from the respective permanent magnets 30, 32, 34, 36, between two axes: (1) the radial axis 66 that extends between the radially outer end 62 of the respective permanent magnet 30, 32, 34, 36 and the centerline 18 of the electric machine 10; and (2) a radial axis 74 that extends between the radially outer end 62 of the adjacent, overlapping permanent magnet 30, 32, 34, 36 and the centerline 18 of the electric machine 10. The outer exposure fraction of each permanent magnet 30, 32, 34, 36 is not limited to any particular value; however, the outer exposure fraction may preferably have a value that is greater than one (1). The outer exposure fraction of each permanent magnet 30, 32, 34, 36 may be selected to enable the rotor 12 to achieve a desired rotor magnetic field. For example, to achieve a relatively strong rotor magnetic field, the permanent magnets 30, 32, 34, 36 may be positioned on the rotor 12 so that they each have a relatively high outer exposure fraction.

Referring to FIG. 4, the inner exposure fraction of each permanent magnet 30, 32, 34, 36 is equal to a ratio of two values: (1) the body width 70 of the respective permanent magnet 30, 32, 34, 36; and (2) an inner exposure width 76 of the respective permanent magnet 30, 32, 34, 36. In embodiments in which the permanent magnets 30, 32, 34, 36 are circumferentially non-overlapping, the inner exposure width 76 is a distance that extends circumferentially, at a position radially inward from the respective permanent magnets 30, 32, 34, 36, between two axes: (1) the radial axis 66 that extends between the radially outer end 62 of the respective permanent magnet 30, 32, 34, 36 and the centerline 18 of the electric machine 10; and (2) the radial axis 68 that extends between the radially inner end 64 of the respective permanent magnet 30, 32, 34, 36 and the centerline 18 of the electric machine 10. Referring to FIG. 9, in embodiments in which the permanent magnets 30, 32, 34, 36 are circumferentially overlapping, the inner exposure width 76 is a distance that extends circumferentially, at a position radially inward from the respective permanent magnets 30, 32, 34, 36, between two axes: (1) the radial axis 66 that extends between the radially inner end 64 of the respective permanent magnet 30, 32, 34, 36 and the centerline 18 of the electric machine 10; and (2) a radial axis 74 that extends between the radially inner end 64 of the adjacent, overlapped permanent magnet 30, 32, 34, 36 and the centerline 18 of the electric machine 10. The inner exposure fraction of each permanent magnet 30, 32, 34, 36 is not limited to any particular value; however, the inner exposure fraction may preferably have a value that is greater than one (1). The inner exposure fraction of each permanent magnet 30, 32, 34, 36 may be selected to enable the rotor 12 to achieve a desired rotor magnetic field. For example, to achieve a relatively strong rotor magnetic field, the permanent magnets 30, 32, 34, 36 may be positioned on the rotor 12 so that they each have a relatively high inner exposure fraction.

Figure 3:
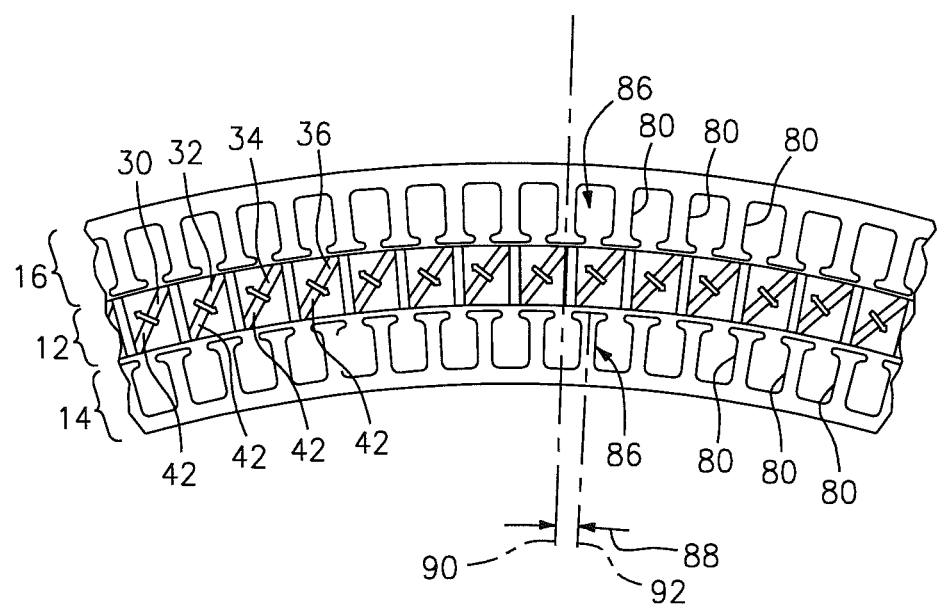
FIG. 3 illustrates a partial sectional view of the rotor and the stators of the electric machine of FIG. 1.

Referring to FIG. 3, each of the stators 14, 16 is annularly-shaped and includes a plurality of circumferentially-spaced, radially-extending stator teeth 80. In the embodiment illustrated in FIG. 3, for example, the outer stator 16 includes a plurality of stator teeth 80 that extend from the outer stator 16 radially toward the centerline 18 of the electric machine 10, and the inner stator 14 includes a plurality of stator teeth 80 that extend from the inner stator 14 radially away from the centerline 18. Each of the stators 14, 16 also includes a plurality of stator coils 82. The stator coils 82 are omitted from FIG. 3, but can be seen, for example, in FIGS. 1 and 2. Each stator tooth 80 has a stator coil 82 wrapped around it in a known manner. In embodiments in which the electric machine 10 is operated as an electric motor, the stator coils 82 may be electrically connected to an AC power supply in a known manner. In embodiments in which the electric machine 10 is operated as an electric generator, the stator coils 82 may be electrically connected to a power storage device in a known manner.

Each stator tooth 80 and the corresponding stator coil 82 that is wrapped around it form what is referred to hereinafter as a stator pole 86. Each stator 14, 16 may be described as having a plurality of circumferentially-spaced stator poles 86. Aspects of the present invention are not limited to use with a stator 14, 16 having any particular number of stator poles 86. The number of stator poles 86 included in each of the stators 14, 16 may preferably be equal to the number of permanent magnets 30, 32, 34, 36 included in the rotor 12. The number of stator poles may vary depending on one or more factors, including, for example, the size (e.g., diameter) of the stators 14, 16, the size (e.g., diameter) of the rotor 12, etc. Each stator pole 86 has a corresponding stator pole 86 positioned circumferentially opposite it. These pairs of corresponding stator poles 86 may each be referred to hereinafter as a stator pole pair. In some embodiments, electric current flowing through the stator coils 82 may have one of several phases. In such embodiments, electric currents flowing through the stator coils 82 of each stator pole pair are in phase with one another.

In embodiments similar to the one illustrated in FIG. 3, in which the electric machine 10 includes an inner stator 14 and an outer stator 16 that each have the same number of stator pole pairs, each stator pole pair of the inner stator 14 may correspond to a stator pole pair of the outer stator 16. As indicated above, in some embodiments, electric current flowing through the stator coils 82 may have one of several phases. In such embodiments, electric current flowing through the stator coils 82 of the corresponding stator pole pairs of the inner stator 14 and the outer stator 16 may have the same phase. In embodiments in which the inner stator 14 and the outer stator 16 have corresponding stator pole pairs, the inner stator 14 and the outer stator 16 may be positioned relative to one another so that their corresponding stator pole pairs are circumferentially offset from one another by an offset angle 88. Referring to FIG. 3, the offset angle 88 extends between two axes: (1) a radial axis 90 that extends between a stator pole 86 of the outer stator 16 and the centerline 18 of the electric machine 10; and (2) a radial axis 92 that extends between a corresponding stator pole 86 of the inner stator 14 and the centerline 18 of the electric machine 10. The offset angle 88 may be selected, for example, so that it is equal to three hundred sixty degrees (360°) divided by the number of stator poles 86.

The structure of the stators 14, 16 and/or the positioning of the stators 14, 16 may be selected to achieve a desired interaction of the rotor magnetic field with the stators 14, 16. For example, the number of stator poles 86 included in each of the stators 14, 16 may be selected to be the same as the number of permanent magnets 30, 32, 34, 36 in order to maximize the flux of the rotor magnetic field through the stators 14, 16. Also, the offset angle 88 may be selected to correspond to the magnet angles 50 of the permanent magnets 30, 32, 34, 36 in order to maximize the flux of the rotor magnetic field through the stators 14, 16.

The electric machine 10 may include one or more components, other than the rotor 12 and the stators 14, 16, that can influence: (1) the rotor magnetic field of the rotor 12; and/or (2) the interaction of the rotor magnetic field with the stators 14, 16. One or more features of those components may be selected: (1) so that the rotor 12 achieves a desired rotor magnetic field; and/or (2) to achieve a desired interaction of the rotor magnetic field with the stators 14, 16. In the embodiment illustrated in FIGS. 1-7, for example, the pins 25 (see FIGS. 2, 6, and 7) that extend through the rotor body pieces 40 to provide axial tension between the end ring 24 (see FIG. 2) and the separator 26 (see FIGS. 1 and 2) can alter the individual magnetic fields generated by the permanent magnets 30, 32, 34, 36 as they (the individual magnetic fields) pass through the pins 25. Accordingly, the pins 25 may be designed so that the rotor 12 achieves a desired rotor magnetic field. Pins 25 that are formed by a rolled-up strip of material (e.g., similar to known spring pins) may weaken the individual magnetic fields generated by the permanent magnets 30, 32, 34, 36 as they pass through the pins 25 to a lesser extent than pins 25 that are formed by a solid piece of material. Thus, pins 25 that are formed by a rolled-up strip of material may be selected, for example, to achieve a relatively stronger rotor magnetic field.

The electric machine 10 may be operated as an electric motor, or as an electric generator. During operation of the electric machine 10 as an electric motor, the stator coils 82 are electrically connected to an AC power supply (e.g., a three-phase AC power supply). As electric current from the AC power supply flows through the stator coils 82, a magnetic field is generated. The magnetic field interacts with the rotor magnetic field generated by the rotor 12, and causes the rotor 12 to rotate, which in turn rotationally drives the shaft 22 of the electric machine 10. During operation of the electric machine 10 as an electric generator, the shaft 22 of the electric machine 10 is caused to rotate; e.g., in some embodiments, a plurality of wind turbine blades connected to the shaft 22 may cause the shaft 22 to rotate. Rotation of the shaft 22 causes rotation of the rotor 12, which in turn causes the rotor magnetic field generated by the rotor 12 to rotate. The rotor magnetic field generated by the rotor 12 interacts with the stator coils 82 and causes electric current to flow through the stator coils 82. The stator coils 82 may be connected to a power storage device that receives and stores power generated by the electric current flowing through the stator coils 82.

Aspects of the present invention offer advantages over prior art electric machines. In embodiments in which the electric machine 10 is operated as an electric generator, the rotor magnetic field generated by the rotor 12 may enable the electric machine 10 to generate an amount of power that is equal to or greater than the amount of power generated by a prior art electric machine that includes a prior art rotor having permanent magnets positioned at magnet angles of either zero degrees (0°) or ninety degrees (90°). The present electric machine 10 generates this amount of power despite the fact that the diameter of the rotor 12 (and thus the overall size of the electric machine 10) may be smaller than such prior art rotors as a result of the slanted positioning of the permanent magnets.

While several embodiments have been disclosed, it will be apparent to those of ordinary skill in the art that aspects of the present invention include many more embodiments and implementations. Accordingly, aspects of the present invention are not to be restricted except in light of the attached claims and their equivalents.

What is claimed is:

1. An electric machine, comprising:
   a rotor that includes an annularly-shaped rotor body and a plurality of permanent magnets positionally-fixed relative to the rotor body; and
   an annularly-shaped first stator that includes a plurality of circumferentially-spaced stator poles;
   wherein the rotor and the first stator are concentric and axially-aligned relative to an axial centerline of the electric machine; and
   wherein each of the plurality of permanent magnets creates a magnetic dipole, wherein each magnetic dipole extends along a dipole axis that passes through the respective permanent magnet; and
   wherein each of the plurality of permanent magnets is positioned so that a magnet angle that is between 15° and 75° is defined between the respective dipole axis and a radial axis that extends between the respective permanent magnet and the axial centerline of the electric machine; and
   wherein the plurality of permanent magnets are circumferentially positioned so that adjacent permanent magnets at least partially radially overlap one another.

2. The electric machine of claim 1, wherein the magnet angles of the plurality of permanent magnets are not all the same.

3. The electric machine of claim 1, wherein the plurality of permanent magnets includes at least a first group of said permanent magnets and a second group of said permanent magnets;
   wherein the first group of said permanent magnets includes at least a first permanent magnet disposed at a first magnet angle, and a second permanent magnet disposed at a second magnet angle, wherein the first magnet angle is less than the second magnet angle; and
   wherein the second group of said permanent magnets includes at least a third permanent magnet disposed at a third magnet angle, and a fourth permanent magnet disposed at a fourth magnet angle, wherein the third magnet angle is less than the fourth magnet angle.

4. The electric machine of claim 3, wherein the first magnet angle equals the third magnet angle, and the second magnet angle equals the fourth magnet angle.

5. The electric machine of claim 1, wherein the plurality of permanent magnets are positioned so that the magnetic dipole of each of the plurality of permanent magnets has a polarity that is opposite the magnetic dipole of an adjacent permanent magnet.

6. The electric machine of claim 1, wherein a radially outer end of each of the plurality of permanent magnets circumferentially overlaps a radially inner end of an adjacent permanent magnet.

7. The electric machine of claim 1, wherein the rotor includes a plurality of flux barriers, wherein each of the plurality of flux barriers is disposed circumferentially between one of the plurality of permanent magnets and an adjacent permanent magnet.

8. The electric machine of claim 7, wherein each of the plurality of flux barriers is an axially-extending aperture disposed in the rotor.

9. The electric machine of claim 1, wherein each of the plurality of stator poles of the first stator is formed by a stator tooth that extends radially from the first stator, and a stator coil that is wound around the stator tooth.

10. The electric machine of claim 1, further comprising an annularly-shaped second stator that includes a plurality of circumferentially-spaced stator poles.

11. The electric machine of claim 10, wherein each of the plurality of stator poles of the second stator is formed by a stator tooth that extends radially from the second stator, and a stator coil that is wound around the stator tooth.

12. The electric machine of claim 10, wherein the rotor, the first stator, and the second stator are concentric and axially-aligned relative to the centerline of the electric machine, and wherein the rotor is positioned concentrically between the first stator and the second stator.

13. The electric machine of claim 10, wherein each of the plurality of stator poles on the first stator corresponds to one of the plurality of stator poles on the second stator, and wherein the corresponding stator poles on the first and second stators are offset from one another by an offset angle.

14. An electric machine, comprising:
- a rotor that includes an annularly-shaped rotor body and a plurality of permanent magnets positionally-fixed relative to the rotor body; and
- an annularly-shaped first stator that includes a plurality of circumferentially-spaced stator poles;
- wherein the rotor and the first stator are concentric and axially-aligned relative to an axial centerline of the electric machine; and
- wherein each of the plurality of permanent magnets creates a magnetic dipole, wherein each magnetic dipole extends along a dipole axis that passes through the respective permanent magnet; and
- wherein the each of the plurality of permanent magnets is positioned so that a magnet angle is defined between the respective dipole axis and a radial axis that extends between the respective permanent magnet and the axial centerline of the electric machine, and the plurality of permanent magnets includes at least a first group of said permanent magnets and a second group of said permanent magnets;
- wherein the first group of said permanent magnets includes at least a first permanent magnet disposed at a first magnet angle, and a second permanent magnet disposed at a second magnet angle, wherein the first magnet angle is less than the second magnet angle; and
- wherein the second group of said permanent magnets includes at least a third permanent magnet disposed at a third magnet angle, and a fourth permanent magnet disposed at a fourth magnet angle, wherein the third magnet angle is less than the fourth magnet angle.

* * * * *